(12) United States Patent
Yamaguchi et al.

(10) Patent No.: US 10,737,533 B2
(45) Date of Patent: Aug. 11, 2020

(54) PNEUMATIC TIRE

(71) Applicant: c/o The Yokohama Rubber Co., LTD., Minato-ku, Tokyo (JP)

(72) Inventors: Yukihito Yamaguchi, Hiratsuka (JP); Shoei Kakuta, Hiratsuka (JP); Hideki Hamanaka, Hiratsuka (JP); Risa Tauchi, Hiratsuka (JP); Toshiyuki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 588 days.

(21) Appl. No.: 15/519,501

(22) PCT Filed: Oct. 5, 2015

(86) PCT No.: PCT/JP2015/078159
§ 371 (c)(1),
(2) Date: Apr. 14, 2017

(87) PCT Pub. No.: WO2016/059992
PCT Pub. Date: Apr. 21, 2016

(65) Prior Publication Data
US 2017/0239999 A1   Aug. 24, 2017

(30) Foreign Application Priority Data

Oct. 16, 2014 (JP) .................................. 2014-211964
May 13, 2015 (WO) .................. PCT/JP2015/063719

(51) Int. Cl.
*B60C 11/11* (2006.01)
*B60C 11/03* (2006.01)
*B60C 11/13* (2006.01)

(52) U.S. Cl.
CPC ........... *B60C 11/11* (2013.01); *B60C 11/0304* (2013.01); *B60C 11/0311* (2013.01);
(Continued)

(58) Field of Classification Search
CPC ............. B60C 11/0311; B60C 11/0316; B60C 11/1369; B60C 2011/0346
See application file for complete search history.

(56) References Cited

U.S. PATENT DOCUMENTS

D457,128 S    *  5/2002  Robert .......................... D12/579
2007/0199633 A1*  8/2007  Hayashi ............... B60C 11/0311
                                                    152/209.18
(Continued)

FOREIGN PATENT DOCUMENTS

JP    H09-136514      5/1997
JP    2004-098914     4/2004
(Continued)

OTHER PUBLICATIONS

Machine translation for Japan 2004-262295 (Year: 2019).*
International Search Report for International Application No. PCT/JP2015/078159 dated Nov. 2, 2015, 4 pages, Japan.

*Primary Examiner* — Steven D Maki
(74) *Attorney, Agent, or Firm* — Thorpe North & Western

(57) ABSTRACT

A pneumatic tire includes a plurality of center lug grooves disposed at intervals in a tire circumferential direction that extend crossing a tire equator line and include a first groove turning portion and a second groove turning portion; a plurality of shoulder lug grooves disposed in the intervals between the plurality of center lug grooves in the tire circumferential direction extending outward in the tire width direction, an inner end in the tire width direction being disposed outward of an end of the center lug groove in the tire width direction; a pair of circumferential main grooves to which the ends of the center lug grooves and the inner ends of the plurality of shoulder lug grooves in the tire width direction alternately connect; and a circumferential secondary groove disposed around the entire circumference of the pneumatic tire with a wave-like shape.

15 Claims, 4 Drawing Sheets

(52) U.S. Cl.
CPC .......... *B60C 11/13* (2013.01); *B60C 11/1369* (2013.01); *B60C 2011/0346* (2013.01); *B60C 2011/0353* (2013.01); *B60C 2011/0355* (2013.01); *B60C 2011/0372* (2013.01); *B60C 2200/065* (2013.01)

(56) References Cited

U.S. PATENT DOCUMENTS

| | | | |
|---|---|---|---|
| 2008/0078488 | A1 | 4/2008 | Yoda |
| 2009/0032157 | A1* | 2/2009 | Inoue ................. B60C 11/0311 152/209.8 |
| 2012/0241061 | A1 | 9/2012 | Maehara |
| 2017/0210179 | A1* | 7/2017 | Motomitsu ............... B60C 9/18 |
| 2017/0240000 | A1* | 8/2017 | Manabe ................. B60C 11/13 |

FOREIGN PATENT DOCUMENTS

| | | | |
|---|---|---|---|
| JP | | 2004-224131 | 8/2004 |
| JP | | 2004-262295 A * | 9/2004 |
| JP | | 2006-151083 | 6/2006 |
| JP | | 2007-191093 | 8/2007 |
| JP | | 2008-279976 | 11/2008 |
| JP | | 2010-125999 | 6/2010 |
| JP | | 2012-201253 | 10/2012 |
| JP | | 2012-201253 | 10/2018 |
| WO | WO 2006/001202 | | 1/2006 |
| WO | WO 2006/057169 | | 6/2006 |

\* cited by examiner ively connects the respective first end or second end and the inner end of each of the plurality of shoulder lug grooves in the tire width direction. The tread pattern further includes a plurality of center blocks arranged in the tire circumferential direction and defined by the plurality of center lug grooves and the pair of circumferential main grooves, and a plurality of shoulder blocks arranged in the tire circumferential direction and defined by the plurality of shoulder lug grooves and the pair of circumferential main grooves. The tread pattern further includes a circumferential secondary groove with a wave-like shape disposed around the entire circumference of the pneumatic tire. The circumferential secondary groove intersects the plurality of center lug grooves in a manner such that in each of the plurality of center blocks, the circumferential secondary groove alternately connects the first groove turning portion being in a center lug groove of adjacent center lug grooves of the plurality of center lug grooves on either side of each of the plurality of center blocks in the tire circumferential direction, the second groove turning portion being in the other center lug groove of the adjacent center lug groove. The circumferential secondary groove includes in each of the plurality of center blocks a third groove turning portion that turns with a bent shape or a curved shape located on a side of the first groove turning portion and a fourth groove turning portion that turns with a bent shape or a curved shape located on a side of the second groove turning portion.

PNEUMATIC TIRE

TECHNICAL FIELD

The present technology relates to a pneumatic tire with a tread pattern.

BACKGROUND ART

There is currently a demand for pneumatic tires to be improved in various performance areas. Such improvement may be realized through the design of tread patterns. Heavy duty tires have been provided with a tread pattern designed with improved traction performance in mind.

For example, a heavy duty pneumatic tire is known which improves both traction characteristics on bad roads until the terminal stage of wear and wet performance at high-speeds in a compatible manner (see Japanese Unexamined Patent Application Publication No. H09-136514A). This heavy duty pneumatic tire includes a tread provided with at least one circumferential main groove extending in the circumferential direction, and a plurality of lateral grooves disposed on opposite sides of the circumferential main groove at intervals in the circumferential direction. The plurality of lateral grooves are connected to the circumferential main groove. The circumferential main groove extend in the circumferential direction in a tread central region that corresponds to 50% of the ground contact width. The groove depth of the circumferential main groove is 5% or greater of the ground contact width. The lateral grooves provided in at least the regions on opposite sides of the tread have a groove depth 109% or greater the groove depth of the circumferential main groove.

In this heavy duty pneumatic tire, the area of the tread center region land portion is made large so as to increase the cut resistance performance and wear resistance performance. However, a large tread center region land portion area leads to an increase in the amount of heat build-up, and a small groove area leads to the amount of heat dissipated decreasing. As a result, heat build-up resistance is reduced.

SUMMARY

The present technology provides a pneumatic tire capable of improving heat build-up resistance in the tread center region land portion.

An aspect of the present technology is a pneumatic tire including a tread portion provided with a tread pattern.

The tread pattern includes a plurality of center lug grooves disposed at intervals in a tire circumferential direction that extend crossing a tire equator line. The plurality of center lug grooves each include a first end located in a half-tread region that is on a first side of the tire equator in a tire width direction, a second end located in a half-tread region on a second side opposite the first side in the tire width direction, and a first groove turning portion and a second groove turning portion disposed between the first end and the second end and turning with a bent shape or a curved shape. The tread pattern further includes a plurality of shoulder lug grooves disposed in the intervals in the tire circumferential direction between the plurality of center lug grooves in both of the half-tread regions that extend outward in the tire width direction. The plurality of shoulder lug grooves each include an outer end in the tire width direction that opens to a ground contact edge on each of opposite sides in the tire width direction, and an inner end in the tire width direction located on an outside of a position in the tire width direction of the first end or the second end in the tire width direction. The tread pattern further includes a pair of circumferential main grooves disposed in the respective half-tread regions that extend around an entire circumference of the pneumatic tire in a wave-like shape with a groove width less than that of the plurality of shoulder lug grooves. The pair of circumferential main grooves alternately connects the respective first end or second end and the inner end of each of the plurality of shoulder lug grooves in the tire width direction. The tread pattern further includes a plurality of center blocks arranged in the tire circumferential direction and defined by the plurality of center lug grooves and the pair of circumferential main grooves, and a plurality of shoulder blocks arranged in the tire circumferential direction and defined by the plurality of shoulder lug grooves and the pair of circumferential main grooves. The tread pattern further includes a circumferential secondary groove with a wave-like shape disposed around the entire circumference of the pneumatic tire. The circumferential secondary groove intersects the plurality of center lug grooves in a manner such that in each of the plurality of center blocks, the circumferential secondary groove alternately connects the first groove turning portion being in a center lug groove of adjacent center lug grooves of the plurality of center lug grooves on either side of each of the plurality of center blocks in the tire circumferential direction, the second groove turning portion being in the other center lug groove of the adjacent center lug groove. The circumferential secondary groove includes in each of the plurality of center blocks a third groove turning portion that turns with a bent shape or a curved shape located on a side of the first groove turning portion and a fourth groove turning portion that turns with a bent shape or a curved shape located on a side of the second groove turning portion.

A relationship $0.20 \leq LSG/LSB \leq 0.35$ is preferably satisfied, where LSB is a length in the tire circumferential direction of end portions of the plurality of shoulder blocks on a side of the ground contact edges, and LSG is a groove width of end portions of the plurality of shoulder lug grooves on a side of the ground contact edges.

A raised bottom portion is preferably provided in each of the pair of circumferential main grooves where groove depth becomes partially shallower.

A relationship $D2/T<0.05$ is preferably satisfied, where D2 is a groove depth of the raised bottom portion and T is a ground contact width of the tread portion in the tire width direction.

A relationship $0.9 \leq WSB/LSB \leq 1.3$ is preferably satisfied, where LSB is a length in the tire circumferential direction of end portions of the plurality of shoulder blocks on a side of the ground contact edge, and WSB is a maximum width of the plurality of shoulder blocks in the tire width direction.

A distance W1 from end portions of the plurality of center lug grooves to the tire equator line is preferably at least 0.15 times a ground contact width T of the tread portion in the tire width direction; and a distance W2 from inner ends of the plurality of shoulder lug grooves in the tire width direction to the tire equator line is preferably at most 0.30 times the ground contact width T.

A relationship $0.05 \leq A/WB \leq 0.20$ is preferably satisfied, where WB is a maximum width of the plurality of center blocks in the tire width direction, and A is a maximum distance from the circumferential secondary groove to the tire equator line in the tire width direction. By satisfying this range, heat resistance of the central portion of the center block which is most susceptible to heat build-up can be increased.

Corner portions with an obtuse angle are preferably formed in the plurality of center blocks corresponding to the pair of circumferential main grooves.

A groove width of the pair of circumferential main grooves and a groove width of the plurality of center lug grooves preferably range from 7 mm to 20 mm.

The heavy duty pneumatic tire can be applied to a construction vehicle or an industrial vehicle.

Preferably, the first groove turning portion disposed on the first side bends or curves protruding out toward a third side in the tire circumferential direction and the second groove turning portion disposed on the second side bends or curves protruding out toward a fourth side opposite the third side in the tire circumferential direction. An inclination angle with respect to the tire width direction of a first straight line that joins the first end and a protruding end where the first groove turning portion protrudes toward the third side in the tire circumferential direction and an inclination angle with respect to the tire width direction of a second straight line that joins the second end and a protruding end where the second groove turning portion protrudes toward the fourth side in the tire circumferential direction are greater than an inclination angle with respect to the tire width direction of a third straight line that joins the first end and the second end of each of the plurality of center lug grooves, the straight lines following center positions in a groove width direction of the center lug groove.

An inclination angle with respect to the tire width direction of a fourth straight line that joins a third end of the circumferential subsidiary groove within the plurality of center blocks on a side of the first groove turning portion and the third groove turning portion and an inclination angle with respect to the tire width direction of a fifth straight line that joins a fourth end on a side of the second groove turning portion and the fourth groove turning portion are preferably greater than an inclination angle with respect to the tire width direction of a sixth straight line that joins the third end and the fourth end.

The circumferential secondary groove preferably intersects the tire equator line between the third groove turning portion and the fourth groove turning portion.

According to the tire described above, heat build-up resistance can be improved in a land portion located in a tread center region.

DETAILED DESCRIPTION

A pneumatic tire according to embodiments of the present technology is described below in detail with reference to the accompanying drawings.

In the present specification, "tire radial direction" refers to the direction of the tire rotation center axis. "Outward in the tire width direction" refers to the direction away from the tire equator line in the tire width direction relative to the object of comparison. "Inward in the tire width direction" refers to the direction toward the tire equator line in the tire width direction relative to the object of comparison. "Tire circumferential direction" refers to the direction of rotation of the rotating surface of the tread surface that rotates about the center axis of rotation of the tire when the tire rotates. "Tire radial direction" refers to the direction extending radially out from the center axis of rotation of the tire. "Outward in the tire radial direction" refers to the direction away from the center axis of rotation of the tire relative to the object of comparison. "Inward in the tire radial direction" refers to the direction towards the center axis of rotation of the tire relative to the object of comparison.

"Heavy duty tire" in the present specification includes tires for vehicle type 1 (dump truck, scraper), type 2 (grader), type 3 (shovel loader, etc.), type 4 (tire roller), and a mobile crane (truck crane, wheel crane) as specified according to the Japan Automobile Tyre Manufacturers Association, Inc. (JATMA) Year Book 2014, Chapter D, and tire for vehicles as specified according to Tire and Rim Association, Inc. (TRA) Year Book 2013, Section 4 and Section 6. The heavy duty pneumatic tire according to the present embodiment, may be mounted on a construction vehicle or an industrial vehicle, for example. Examples of construction vehicles and industrial vehicles include a dump truck, scraper, grader, shovel loader, tire roller, wheel crane, truck crane, as well as a compactor, earth mover, grader, loader, and dozer.

Figure 1:
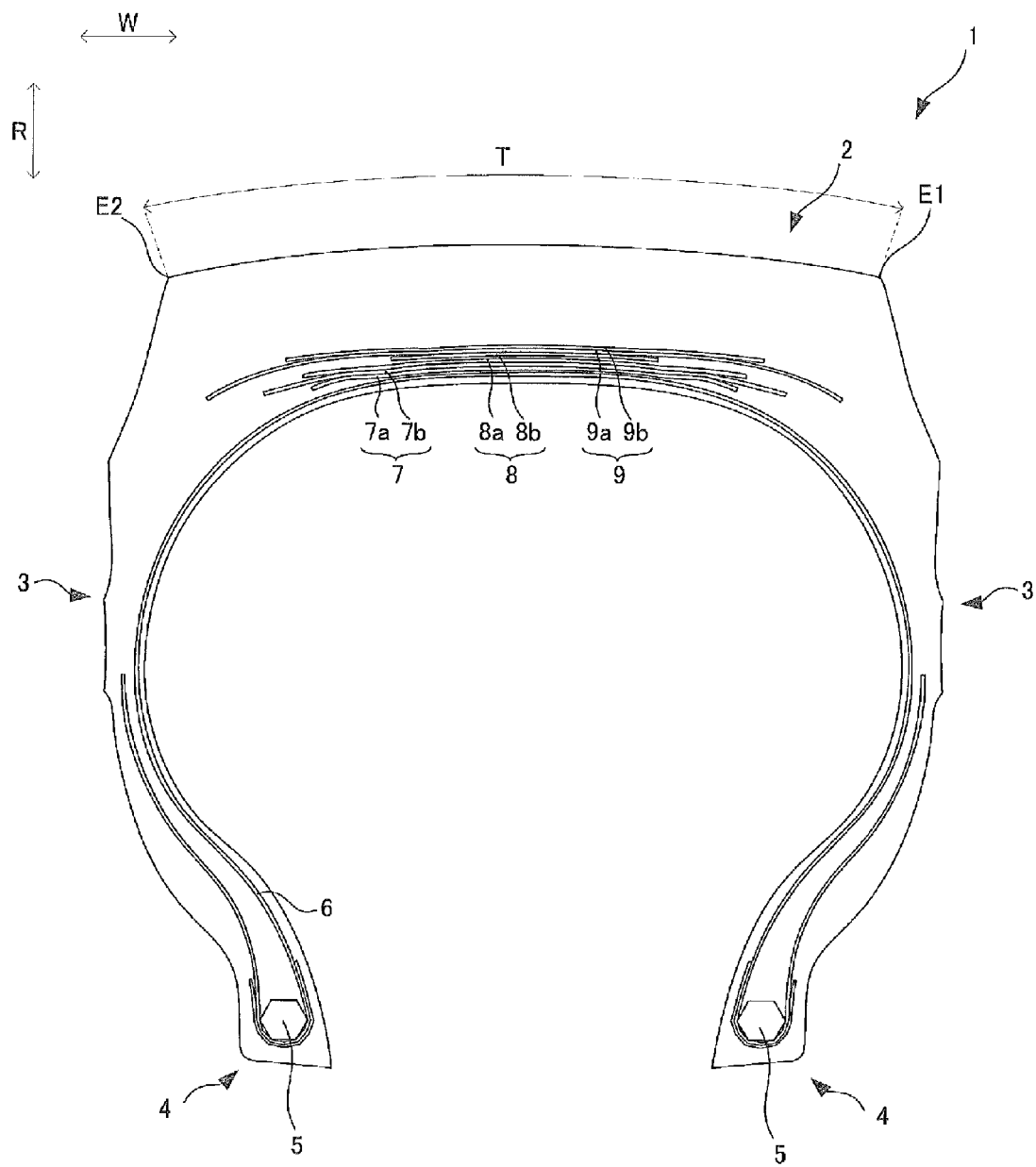
FIG. 1 is a cross-sectional view of an example of a pneumatic radial tire according to the present embodiment.

FIG. 1 is a cross-sectional view of the pneumatic radial tire of the present embodiment (referred to simply as "tire" below) along a plane that passes through the tire rotation axis. In FIG. 1, the tire radial direction is denoted by R and the tire width direction is denoted by W. Note that in FIG. 1, the grooves are omitted.

A tire 1 illustrated in FIG. 1 includes a tread portion 2, a pair of sidewall portions 3, a pair of bead portions 4, and internally includes bead cores 5, a carcass layer 6, and cross belt layers 7, 8, 9.

The pair of bead portions 4 are provided on opposite sides in the tire width direction inward in the tire radial direction. The sidewall portions 3 are disposed outward of the bead portions 4 in the tire radial direction. The sidewall portions 3 are connected in the tire width direction by the tread portion 2 at positions outward in the tire radial direction.

The pair of bead cores 5 are provided inside the bead portions 4. The carcass layer 6 is mounted between the pair of bead cores 5, running from the bead portions 4 to the sidewall portions 3 and then the tread portion 2. The carcass layer 6 is turned up at both end portions at the bead cores 5 from inward in the tire width direction to outward in the tire width direction.

In the tread portion 2, on the outer periphery side of the carcass layer 6, a first cross belt layer 7, a second cross belt layer 8, and a third cross belt layer 9 are disposed in that order from inward to outward in the tire radial direction. The first cross belt layer 7 is made of two belts 7a, 7b. The second cross belt layer 8 is made of two belts 8a, 8b. The third cross belt layer 9 is made of two belts 9a, 9b. Each belt 7a, 7b, 8a, 8b, 9a, 9b includes reinforcing cords inclined with respect to the tire circumferential direction. The inclination angle of the reinforcing cords with respect to the tire circumferential direction is preferably from 18 degrees to 24 degrees.

The first cross belt layer 7 illustrated in FIG. 1 has a configuration in which the belt 7a is located inward in the tire radial direction and the belt 7b is located outward of the belt 7a in the tire radial direction. The width of the belt 7a in the tire width direction is less than the width of the belt 7b in the tire width direction. The reinforcing cords of the belt 7a and belt 7b are inclined in opposition direction with respect to the tire circumferential direction so that the directions of the reinforcing cords intersect.

The second cross belt layer 8 illustrated in FIG. 1 has a configuration in which the belt 8a is located inward in the tire radial direction and the belt 8b is located outward of the belt 8a in the tire radial direction. The width of the belt 8a in the tire width direction is greater than the width of the belt 8b in the tire width direction. The reinforcing cords of the belt 8a and belt 8b are inclined in opposite directions with respect to the tire circumferential direction so that the directions of the reinforcing cords intersect.

The third cross belt layer 9 illustrated in FIG. 1 has a configuration in which the belt 9a is located inward in the tire radial direction and the belt 9b is located outward of the belt 9a in the tire radial direction. The width of the belt 9a in the tire width direction is greater than the width of the belt 9b in the tire width direction. The reinforcing cords of the belt 9a and belt 9b are inclined in opposition directions with respect to the tire circumferential direction so that the directions of the reinforcing cords intersect.

The configuration including the belts 7a, 7b, 8a, 8b, 9a, 9b illustrated in FIG. 1 is one possible example. The widths of the belts 7a, 7b, 8a, 8b, 9a, 9b are not particularly limited. Three cross belt layers 7, 8, 9 are illustrated in FIG. 1, however in some embodiments only two cross belt layers may be provided, and the configuration of the cross belt layers are not particularly limited. Additionally, a sheet-like cushioning material (a rubber layer, for example) may be provided in sections between the belts 7a, 7b, 8a, 8b, 9a, 9b.

A single or a plurality of rubber layers that compose the tread portion 2 are disposed outward of the first cross belt layer 7, the second cross belt layer 8, and the third cross belt layer 9 in the tire radial direction. The rubber of the outermost portion of the tread portion 2 in the tire radial direction has a ratio (tan δ) of loss modulus to storage modulus at 60° C. preferably ranging from 0.04 to 0.2.

Such a configuration is but one possible example of the tire 1 and other known configuration may be employed.

Tread Pattern

Figure 2:
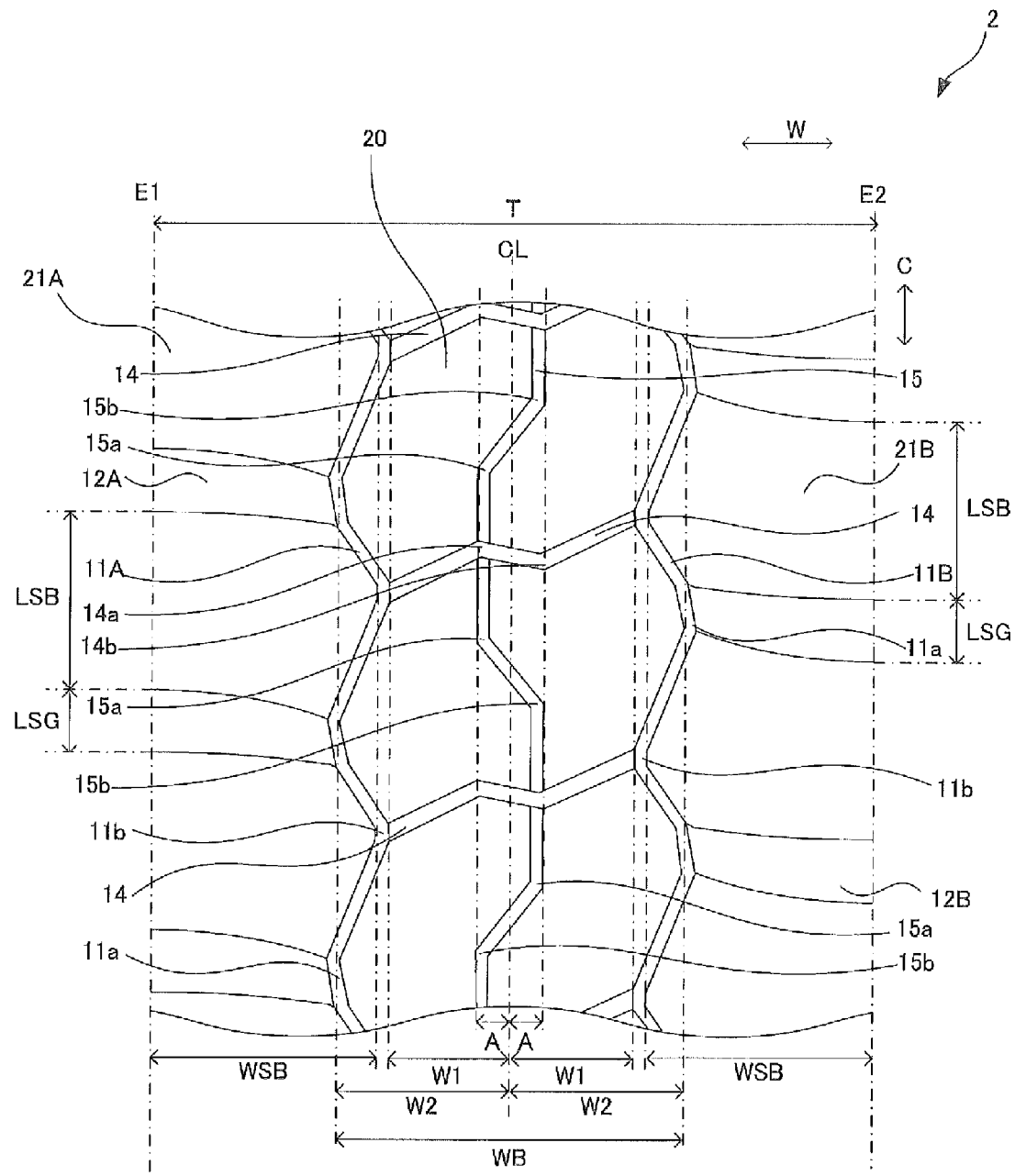
FIG. 2 is a developed plan view illustrating a tread pattern provided on a tread portion of the tire according to the present embodiment.

FIG. 2 is a developed plan view illustrating a tread pattern provided on the tread portion 2 of the tire 1 according to the present embodiment. In FIG. 2, the tire circumferential direction is denoted by C and the tire width direction is denoted by W.

The tread portion 2 is provided with a tread pattern that includes a pair of circumferential main grooves 11A, 11B, a plurality of shoulder lug grooves 12A, 12B, a plurality of center lug grooves 14, and a circumferential secondary groove 15. A plurality of center blocks 20 defined by the pair of circumferential main grooves 11A, 11B and the center lug grooves 14 are formed in a row in the tire circumferential direction. Additionally, a plurality of shoulder blocks 21A defined by the circumferential main groove 11A and the shoulder lug grooves 12A are formed in a row in the tire circumferential direction, and a plurality of shoulder blocks 21B defined by the circumferential main groove 11B and the shoulder lug grooves 12B are formed in a row in the tire circumferential direction. Note that in the present embodiment, the tread pattern of the tread portion 2 has point symmetry with respect to a point of intersection between any center lug groove 14 and the tire equator line CL.

Center Lug Groove

A plurality of the center lug grooves 14 are disposed at intervals in the tire circumferential direction. The center lug grooves 14 cross the tire equator line CL and extend in the half-tread regions of opposite sides of the tire equator line CL in the tire width direction to two ends. The center lug grooves 14 connect the circumferential main groove 11A disposed in one of the half-tread regions (the half-tread region from the tire equator line CL to one of the ground contact edges E1) and the circumferential main groove 11B disposed in the other half-tread region (the half-tread region from the tire equator line CL to the other ground contact edge E2). In other words, the center lug grooves 14 each include an end that connects to the circumferential main groove 11A in one half-tread region and an end that connects to the circumferential main groove 11B in the other half-tread region.

The ground contact edges E1, E2 are points of intersection between the extension line of the external form of the tread portion 2 and the extension line of the external form of the sidewall portion 3. In embodiments in which the portions where the tread portion 2 and the sidewall portion 3 connect are not rounded, the portions where the external forms of the tread portion 2 and the sidewall portion 3 connect correspond to ground contact edges E1, E2, as illustrated in FIG. 1. A ground contact width T is the distance between the ground contact edges E1, E2.

The position of the end (first end) of the center lug groove 14 located on the side of the circumferential main groove 11A and the position of the end (second end) of the center lug groove 14 located on the side of the circumferential main groove 11B are preferably offset from each other in the tire circumferential direction, and the center lug groove 14 is preferably inclined with respect to the tire equator line CL. The inclination angle of the center lug groove 14 with respect to the tire equator line CL preferably ranges from 65° to 85°. "Inclination angle of the center lug groove 14 with respect to the tire equator line CL" refers to the angle formed by the straight line that joins opposite end portions of the center lug groove 14 that follows center positions in the groove width direction and the tire equator line CL.

The groove width of the center lug grooves 14 preferably ranges from 7 mm to 20 mm.

Additionally, between a first end connected to the circumferential main groove 11A and a second end connected to the circumferential main groove 11B, the center lug groove 14 includes a first groove turning portion 14a and a second groove turning portion 14b that turn with a bent shape or a curved shape. The first groove turning portion 14a is preferably provided on the side (first side) of the tire equator line where the circumferential main groove 11A is disposed, and the second groove turning portion 14b is preferably provided on the side (second side) of the tire equator line where the circumferential main groove 11B is disposed. Note that in the present embodiment, the center lug groove 14 intersects the tire equator line between the first groove turning portion 14a and the second groove turning portion 14b. However, the center lug groove 14 may not intersect the tire equator line between the first groove turning portion 14a and the second groove turning portion 14b.

At the groove turning portions 14a, 14b, the center lug groove 14 may bend to form an angled shape or turn to form a rounded curved shape. An angled shape includes a shape that bends at a predetermined radius of curvature. Additionally, the portions of the center lug groove 14 other than the groove turning portions 14a, 14b may have a rectilinear shape or a curved shape. In embodiments in which the groove turning portions 14a, 14b and the portions other than the groove turning portions 14a, 14b have a curved shape, the curved shapes may have the same radius of curvature. Additionally, one of two groove turning portions 14a, 14b may have a bent shaped connection portion formed by a rectilinear groove and a curved groove connecting, and the other may have a curved shaped connection portion.

Figure 3:
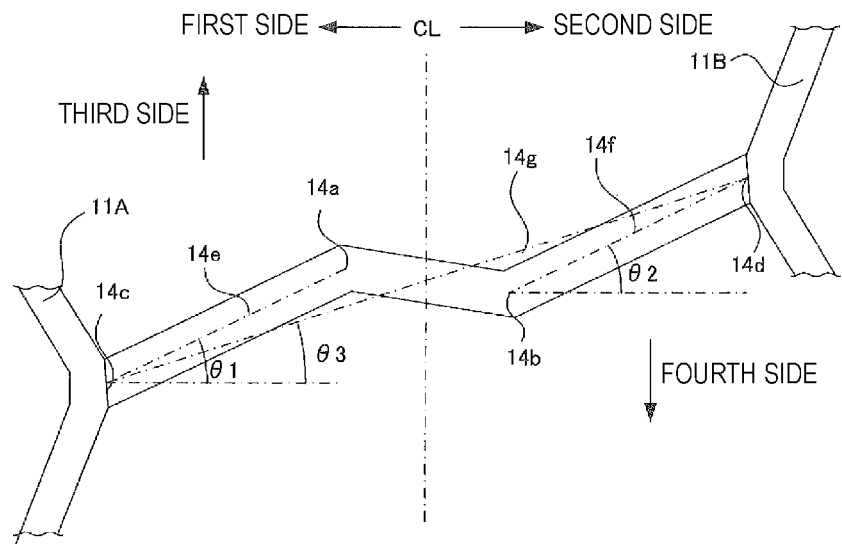
FIG. 3 is an enlarged view of a center lug groove.

FIG. 3 is an enlarged view of the center lug groove 14. Note that in FIG. 3, the circumferential secondary groove 15 is omitted. In the present embodiment, the end portion of the center lug groove 14 on the side on the side of the circumferential main groove 11A (first side) is defined as first end 14c, the end portion on the side of the circumferential main groove 11B (second side) is defined as second end 14d, the straight line that joins the center position of the first end 14c in the groove width direction and the center position of the first groove turning portion 14a in the groove width direction is defined as first straight line 14e, the straight line that joins the center position of the second end 14d in the groove width direction and the center position of the second groove turning portion 14b in the groove width direction is defined as second straight line 14f, and the straight line that joins the center position of the first end 14c in the groove width direction and the center position of the second end 14d in the groove width direction is defined as third straight line 14g.

Note that in embodiments in which the first groove turning portion 14a has a curved shape, the straight line that joins the center position in the groove width direction of a protruding end of the first groove turning portion 14a that protrudes in the tire circumferential direction and the center position of the first end 14c in the groove width direction is defined as first straight line 14e. In embodiments in which the second groove turning portion 14b has a curved shape, the straight line that joins the center position in the groove width direction of a protruding end of the second groove turning portion 14b that protrudes in the tire circumferential direction and the center position of the second end 14d in the groove width direction is defined as second straight line 14f.

The inclination angle of the first straight line 14e with respect to the tire circumferential direction and the inclination angle of the second straight line 14f with respect to the tire circumferential direction preferably ranges from 55° to 75°. In other words, the inclination angle θ1 (0°≤θ1≤90°) of the first straight line 14e with respect to the tire width direction and the inclination angle θ2 (0°≤θ2≤90°) of the second straight line 14f with respect to the tire width direction preferably range from 15° to 35°.

Note that the position of the first end 14c and the position of second end 14d are preferably offset from each other in the tire circumferential direction, and the center lug groove 14 is preferably inclined with respect to the tire equator line CL. The direction in the tire circumferential direction in which the second end 14d is located relative to the first end 14c is defined as the third side, and the direction in the tire circumferential direction in which the first end 14c is located relative to the second end 14d is defined as the fourth side. The third side is the upper side in FIG. 3 and the fourth side is the lower side. The first groove turning portion 14a is preferably located on the third side relative to the third straight line 14g, and the second groove turning portion 14b is preferably located on the fourth side relative to the third straight line 14g. In other words, relationships θ1>θ3 and θ2>θ3 are preferably satisfied, where θ3 (0°≤θ3≤90°) is an inclination angle of the third straight line with respect to the tire width direction. θ3 preferably ranges from 5° to 25°.

In the present embodiment, by providing the center lug grooves 14 with the first groove turning portion 14a and the second groove turning portion 14b, tread rigidity of the center blocks 20 can be increased.

In other words, when the center blocks 20 separate from the road surface and are kicked back and when the center blocks 20 experience collapse deformation caused by shear force in the tire circumferential direction acting on the center blocks 20 due to the interaction with the road surface, center blocks 20 adjacent in the circumferential direction interlock at the groove turning portions 14a, 14b of the center lug grooves 14 and function integrally to produce a counter force. As a result, tread rigidity of the center blocks 20 can be increased. By increasing tread rigidity of the center blocks 20, the center blocks 20 can be prevented from collapsing. Thus localized wear in the center blocks 20 on opposite sides in the tire circumferential direction of the center lug groove 14 can be suppressed.

Circumferential Secondary Groove

The circumferential secondary groove 15 intersects the center lug groove 14 at the position of either the first groove turning portion 14a or the second groove turning portion 14b. The circumferential secondary groove 15 intersects the center lug groove 14 so that the circumferential secondary groove 15 on one side in the tire circumferential direction of the center lug groove 14 and the circumferential secondary groove 15 on the other side in the tire circumferential direction of the center lug groove 14 share a position in the tire width direction and share the same angle with respect to the tire circumferential direction.

The position where the circumferential secondary groove 15 intersects the center lug grooves 14 is different at center lug grooves 14 adjacent in the tire circumferential direction.

In other words, the circumferential secondary groove 15 intersects the center lug groove 14 located on one side in the tire circumferential direction of the center block 20 at a position of the first groove turning portion 14a and the center lug groove 14 located on the other side in the tire circumferential direction of the center block 20 at a position of the second groove turning portion 14b. The circumferential secondary groove 15 extends around the entire circumference of the tire circumference with a wave-like shape to intersect the center lug grooves 14 in a manner such that the first groove turning portion 14a of the one of the center lug grooves 14 adjacent in the tire circumferential direction on either side of the center block 20 and the second groove turning portion 14b of the other center lug groove 14 alternately connect to the circumferential secondary groove 15.

By disposing the circumferential secondary groove 15 around the entire circumference of the tire, air in the circumferential secondary groove 15 can flow in the tire circumferential direction. As a result, the center blocks 20 can be efficiently cooled and heat resistance can be increased. Additionally, by the circumferential secondary groove 15 having a wave-like shape, surface area of the circumferential secondary groove 15 can be increased while maintaining small groove area. As a result, rigidity of the center blocks 20 and wear resistance can be maintained and heat resistance can be increased.

The circumferential secondary groove 15 includes in each center block 20 a third groove turning portion 15a located on the side of the first groove turning portion 14a that turns with a bent shape or a curved shape and a fourth groove turning portion 15b located on the side of the second groove turning portion 14b that turns with a bent shape or a curved shape. By the circumferential secondary groove 15 including the third groove turning portion 15a and the fourth groove turning portion 15b, the portions of the center block 20 on either side of the circumferential secondary groove 15 in the tire width direction interlock at the third groove turning portion 15a and the fourth groove turning portion 15b of the circumferential secondary groove 15 to function integrally and produce a counter force. As a result, tread rigidity of the center blocks 20 can be increased.

The third groove turning portion 15a is preferably provided on the side (first side) of the tire equator line CL where the circumferential main groove 11A is disposed, and the fourth groove turning portion 15b is preferably provided on the side (second side) of the tire equator line CL where the circumferential main groove 11B is disposed.

At the groove turning portions 15a, 15b, the circumferential secondary groove 15 may bend to form an angled shape or turn to form a rounded curved shape. An angled shape includes a shape that bends at a predetermined radius of curvature. Additionally, the portions of the circumferential secondary groove 15 other than the groove turning portions 15a, 15b may have a rectilinear shape or a curved shape. In embodiments in which the groove turning portions 15a, 15b and the portions other than the groove turning portions 15a, 15b have a curved shape, the curved shapes may have the same radius of curvature. Additionally, one of the first groove turning portions 15a, 15b may have a bent shape formed by a rectilinear groove and a curved groove connecting, and the other may have a curved shape.

Figure 4:
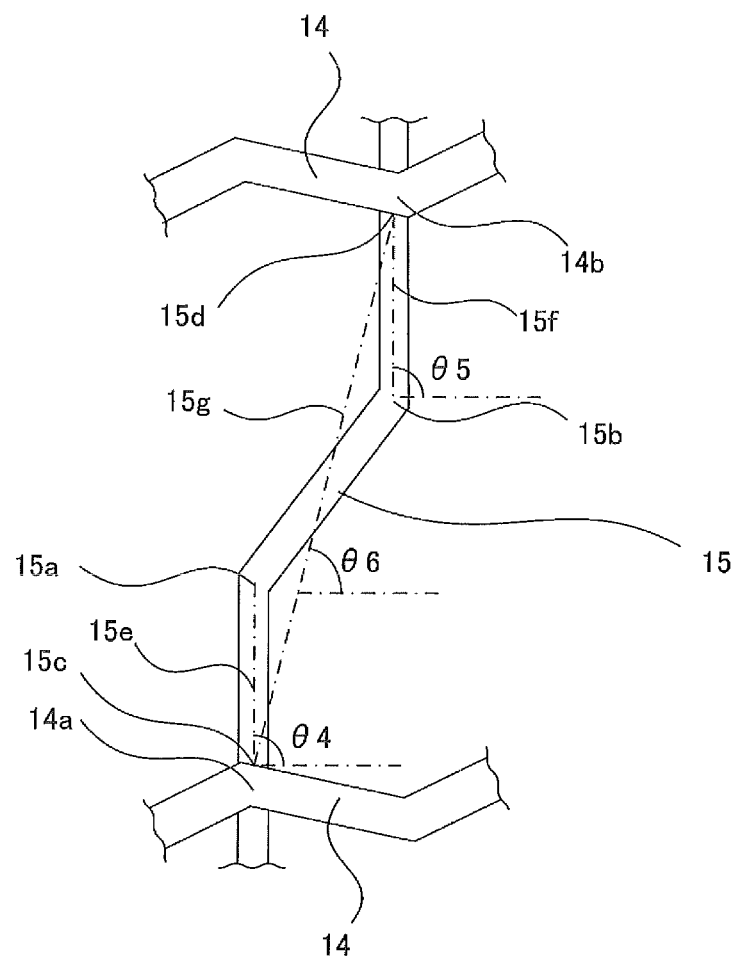
FIG. 4 is an enlarged view of a circumferential secondary groove.

FIG. 4 is an enlarged view of the circumferential secondary groove 15. In the present embodiment, the end portion of the circumferential secondary groove 15 on the side of the third groove turning portion 15a is defined as a third end 15c, the end portion on the side of the fourth groove turning portion 15b is defined as a fourth end 15d, the straight line that joins the center position of the third end 15c in the groove width direction and the center position of the first groove turning portion 14a in the groove width direction is defined as fourth straight line 15e, the straight line that joins the center position of the fourth end 15d in the groove width direction and the center position of the second groove turning portion 14b in the groove width direction is defined as fifth straight line 15f, and the straight line that joins the center position of the third end 15c in the groove width direction and the center position of the fourth end 15d in the groove width direction is defined as sixth straight line 15g.

Note that in embodiments in which the third groove turning portion 15a has a curved shape, the straight line that joins the center position in the groove width direction of a protruding end of the third groove turning portion 15a located farthest from the sixth straight line 15g and the center position of the third end 15c in the groove width direction is defined as fourth straight line 15e. In embodiments in which the fourth groove turning portion 15b has a curved shape, the straight line that joins the center position in the groove width direction of a protruding end of the fourth groove turning portion 15b located farthest from the sixth straight line 15g and the center position of the fourth end 15d in the groove width direction is defined as fifth straight line 15f.

In such embodiments, relationships θ4>θ6 and θ5>θ6 are preferably satisfied, where θ4 (0°≤θ4≤90°) is the inclination angle of the fourth straight line 15e with respect to the tire width direction, θ5 (0°≤θ5≤90°) is the inclination angle of the fifth straight line 15f with respect to the tire width direction, and θ6 (0°≤θ6≤90°) is the inclination angle of the sixth straight line 15g with respect to the tire width direction.

A relationship 0.05≤A/WB≤0.20 is preferably satisfied, where WB is the maximum width of the center block 20 in the tire width direction and A is the maximum distance from the circumferential secondary groove 15 to the tire equator line CL in the tire width direction. By satisfying this range, heat resistance of the central portion of the center block 20 which is most susceptible to heat build-up can be increased.

Note that in FIG. 2, the circumferential secondary groove 15 intersects the tire equator line CL between the third groove turning portion 15a and the fourth groove turning portion 15b. However the present technology is not limited to this configuration, and the circumferential secondary groove 15 may intersect the tire equator line CL at any position or may not intersect the tire equator line CL.

Shoulder Lug Groove

The shoulder lug grooves 12A, 12B are disposed in the intervals between the center lug grooves 14 in the tire circumferential direction. The shoulder lug groove 12A, in one of the half-tread regions, extends outward in the tire width direction and in one direction in the tire rotation direction C (upward in FIG. 2) and opens to the ground contact edge E1. The shoulder lug groove 12B, in the other half-tread region, extends outward in the tire width direction and the other direction in the tire rotation direction C (downward in FIG. 2) and opens to the ground contact edge E2.

The position of the end portion of the shoulder lug groove 12A on the side of the circumferential main groove 11A and the end portion on the side of the ground contact edge E1 may be offset from each other in the tire circumferential direction. In other words, the shoulder lug groove 12A may be inclined with respect to the tire equator line CL. In the present embodiment, the inclination angle of the shoulder lug groove 12A with respect to the tire equator line CL ranges from 75° to 88°. "Inclination angle of the shoulder lug groove 12A with respect to the tire equator line CL" refers to the angle formed by the straight line that joins opposite end portions of the shoulder lug groove 12A that follows center positions in the groove width direction and the tire equator line CL.

In a similar manner, the position of the end portion of the shoulder lug groove 12B on the side of the circumferential main groove 11B and the end portion on the side of the ground contact edge E2 may be offset from each other in the tire circumferential direction. In other words, the shoulder lug groove 12B may be inclined with respect to the tire equator line CL. In the present embodiment, the inclination angle of the shoulder lug groove 12B with respect to the tire equator line CL ranges from 75° to 88°. "Inclination angle of the shoulder lug groove 12B with respect to the tire equator line CL" refers to the angle formed by the straight line that joins opposite end portions of the shoulder lug groove 12B that follows center positions in the groove width direction and the tire equator line CL.

The position in the tire width direction of the inward ends of the shoulder lug grooves 12A, 12B in the tire width direction are located outward from the positions in the tire width direction of the ends of the center lug groove 14 in the tire width direction. In other words, W1<W2 is satisfied, where W1 is the distance from the end portion of the center lug groove 14 to the tire equator line CL and W2 is the distance from the inner ends of the shoulder lug grooves 12A, 12B in the tire width direction to the tire equator line CL.

W1 is preferably at least 0.15 times the ground contact width T, and W2 is preferably at most 0.30 times the ground contact width T. By satisfying these ranges, an appropriate ratio of rigidity between the center blocks 20 and the shoulder blocks 21A, 21B can be maintained, and good heat resistance and wear resistance can be obtained in a compatible manner.

The shoulder lug grooves 12A, 12B have a wider groove width than the center lug grooves 14.

Note that the groove width of the shoulder lug grooves 12A, 12B may vary in the tire width direction. For example, the groove width of the shoulder lug grooves 12A, 12B at the inner end portions in the tire width direction may be less than the groove width at the end portions on the side of the ground contact edges. By the groove width of the shoulder lug grooves 12A, 12B widening from the inner end portion in the tire width direction to the end portion on the side of the ground contact edge, water drainage performance from the inner side in the tire width direction to the ground contact edge can be increased.

Circumferential Main Groove

In the half-tread region on the first side (the half-tread region between the tire equator line CL and the ground contact edge E1), the circumferential main groove 11A extends around the entire circumference of the tire in wave-like shape with the first end of the center lug groove 14 and the inner end of the shoulder lug groove 12A in the tire width direction connecting to the circumferential main groove 11A at alternating positions.

In the half-tread region on the second side (the half-tread region between the tire equator line CL and the ground contact edge E2), the circumferential main groove 11B extends around the entire circumference of the tire in wave-like shape with the second end of the center lug groove 14 and the inner end of the shoulder lug groove 12B in the tire width direction connecting to the circumferential main groove 11B at alternating positions.

Here, the circumferential main grooves 11A, 11B having a "wave-like shape" refers to sinuous shape in which the circumferential main grooves 11A, 11B change position in the tire width direction as they extend in the circumferential direction.

The circumferential main groove 11A extends around the entire circumference of the tire in a wave-like shape with connection portions 11a where the circumferential main groove 11A and the inner end of the shoulder lug groove 12A in the tire width direction are connected and connection portions 11b where the circumferential main groove 11A and the first end of the center lug groove 14 are connected being disposed in an alternating arrangement in the tire circumferential direction. By providing the connection portion 11a, the circumferential main groove 11A turns protruding outward in the tire width direction with a bent shape or a curved shape. By providing the connection portion 11b, the circumferential main groove 11A turns protruding inward in the tire width direction with a bent shape or a curved shape.

The circumferential main groove 11B extends around the entire circumference of the tire in a wave-like shape with connection portions 11a where the circumferential main groove 11B and the inner end of the shoulder lug groove 12B in the tire width direction are connected and connection portions 11b where the circumferential main groove 11B and the second end of the center lug groove 14 are connected being disposed in an alternating arrangement in the tire circumferential direction. By providing the connection portion 11a, the circumferential main groove 11B turns protruding outward in the tire width direction with a bent shape or a curved shape. By providing the connection portion 11b, the circumferential main groove 11B turns protruding inward in the tire width direction with a bent shape or a curved shape.

The circumferential main grooves 11A, 11B may have an angled shape at the connection portions 11a, 11b or may have a rounded curved shape. An angled shape includes a shape that bends at a predetermined radius of curvature. Additionally, the portions of the circumferential main grooves 11A, 11B other than the connection portions 11a, 11b may have a rectilinear shape or a curved shape. In embodiments in which the connection portions 11a, 11b and the portions other than the connection portions 11a, 11b have a curved shape, the curved shapes may have the same radius of curvature. Additionally, one of two connection portions 11a, 11b adjacent in the tire circumferential direction may have a bent shape formed by a connected rectilinear shaped groove and curved shaped groove and the other may have a curved shape.

The circumferential main grooves 11A, 11B have a narrower groove width than the shoulder lug grooves 12A, 12B. The width of the circumferential main grooves 11A, 11B preferably ranges from 7 mm to 20 mm, for example.

The position of the connection portion 11a of the circumferential main groove 11A in the tire circumferential direction is offset from the position of the connection portion 11a of the circumferential main groove 11B in the tire circumferential direction. In other words, the connection portion 11a of the circumferential main groove 11A and the connection portion 11a of the circumferential main groove 11B have an alternating arrangement in the tire circumferential direction.

In a similar manner, the position of the connection portion 11b of the circumferential main groove 11A in the tire circumferential direction is offset from the position of the connection portion 11b of the circumferential main groove 11B in the tire circumferential direction. In other words, the connection portion 11b of the circumferential main groove 11A and the connection portion 11b of the circumferential main groove 11B have an alternating arrangement in the tire circumferential direction.

Accordingly, the wave-like shape of the circumferential main groove 11A and the wave-like shape of the circumferential main groove 11B have substantially identical wavelengths but are out of phase.

Additionally, the circumferential main grooves 11A, 11B are preferably provided with a raised bottom portion 11c which is a portion where the groove depth is shallow.

Figure 5:
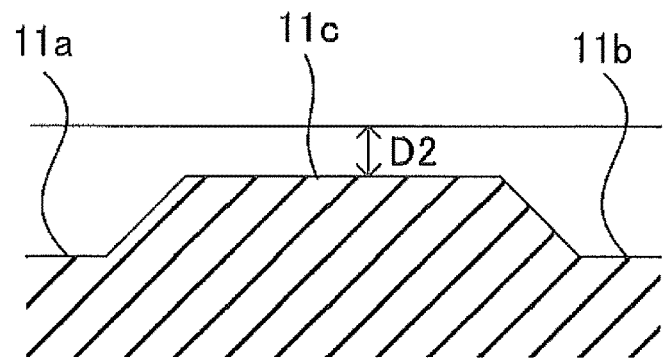
FIG. 5 is a view illustrating an example of a raised bottom portion in a circumferential main groove of the tire according to the present embodiment.

FIG. 5 is a cross-sectional view of an example of the circumferential main groove 11A provided with the raised bottom portion 11c illustrating the region between the connection portion 11a and the connection portion 11b. Note that in a similar manner, the circumferential main groove 11B may also be provided with the raised bottom portion 11c. As illustrated in FIG. 5, the raised bottom portion 11c is provided between the connection portion 11a and the connection portion 11b. In FIG. 5, the depth of the circumferential main grooves 11A, 11B is at a maximum at the connection portion 11a and the connection portion 11b. The depth of the raised bottom portion 11c is less than that of the connection portion 11a and the connection portion 11b. The depth of the circumferential main grooves 11A, 11B at the deepest portion is preferably the same as that of the shoulder lug grooves 12A, 12B.

By providing the raised bottom portion 11c in the circumferential main grooves 11A, 11B, rigidity of a shoulder block 21A surrounded by the shoulder lug grooves 12A and the circumferential main groove 11A, center blocks 20, and a shoulder block 21B surrounded by the shoulder lug grooves 12B and the circumferential main groove 11B is increased. As a result, the amount of deformation of the shoulder block 21A, center blocks 20, and the shoulder lug grooves 12B decreases, and thus the amount of heat produced due to deformation can be reduced. Additionally, by providing the raised bottom portion 11c, the area of the bottom surface of the circumferential main grooves 11A, 11B increases and the contact area where the air flows along the circumferential main grooves 11A, 11B increases. As a result, heat dissipation performance can be increased.

Note that the connection portion 11a and the connection portion 11b may also be provided with the raised bottom portion 11c. In such embodiments, the depth of the raised bottom portion 11c may be less than the groove depth of the shoulder lug grooves 12. Additionally, the deepest groove depth of the circumferential main grooves is preferably the same as the groove depth of the shoulder lug grooves 12.

The depth of the raised bottom portion 11c may be uniform, or the depth may vary within a range that does not go below the depth of the deepest groove depth. For example, in one embodiment, the raised bottom portion 11c may become shallower in a stepwise manner from the deepest depth portion of the circumferential main grooves 11A, 11B. In another embodiment, the raised bottom portion 11c may continuously become shallower from the deepest depth portion.

In such embodiments, a relationship $D2/T<0.05$ is preferably satisfied, where $D2$ is the shallowest groove depth of the raised bottom portion 11c. If $D2/T$ is equal to or greater than 0.05, the effect of the raised bottom portion 11c of suppressing the amount of deformation cannot be sufficiently obtained. $D2/T$ is preferably greater than 0.02 to ensure breathability of the circumferential main grooves 11A, 11B.

Center Block

The corner portions of the center blocks 20 at the connection portions 11a, 11b preferably have an obtuse angle. In other words, the bend angle of the circumferential main groove 11A or the circumferential main groove 11B at the connection portion 11a and the angle formed by the circumferential main groove 11A or the circumferential main groove 11B at the connection portion 11b and the center lug groove 14 are preferably obtuse. By the corner portions of the center blocks 20 having an obtuse angle, sufficient rigidity in the corner portions of the center blocks 20 can be obtained. As a result, elastic deformation of the corner portions of the center blocks 20 can be suppressed, and thus heat build-up caused by such elastic deformation can be suppressed.

Additionally, by the bend angle at the connection portion 11b being obtuse, sufficient rigidity in the corner portions of the shoulder blocks 21A, 21B located outward of the connection portions 11b in the tire width direction can be obtained. As a result, elastic deformation of the corner portions of the shoulder blocks 21A, 21B can be suppressed, and thus heat build-up caused by such elastic deformation can be suppressed.

Shoulder Block

For the shoulder blocks 21A, 21B, a relationship $0.20 \leq LSG/LSB \leq 0.35$ is preferably satisfied, where LSB is the length in the tire circumferential direction of the end portion of the shoulder blocks 21A, 21B on the side of the ground contact edge, and LSG is the interval in the tire circumferential direction at the end portion on the side of the ground contact edge (in other words, the groove width of the shoulder lug grooves 12A, 12B at the end portions on the side of the ground contact edge). In embodiments in which the length in the tire circumferential direction of the end portions of the shoulder blocks 21A, 21B on the side of the ground contact edge differs, LSB is the average value.

In a similar manner, in embodiments in which the groove width of the shoulder lug grooves 12A, 12B at the end portion on the side of the ground contact edge differs, LSG is the average value. By satisfying $0.20 \leq LSG/LSB \leq 0.35$, heat resistance can be improved while maintaining wear resistance of the shoulder blocks 21A, 21B. If $LSG/LSB$ is less than 0.20, heat resistance of the shoulder blocks 21A, 21B decreases. If $LSG/LSB$ is greater than 0.35, wear resistance of the shoulder blocks 21A, 21B decreases and uneven wear occurs.

A relationship $0.9 \leq WSB/LSB \leq 1.3$ is preferably satisfied, where WSB is the maximum width of the shoulder blocks 21A, 21B in the tire width direction. In embodiments in which the maximum width of the shoulder blocks 21A, 21B in the tire width direction differs, WSB is the average value. By setting WSB/LSB in this range, an appropriate balance between rigidity of the shoulder blocks 21A, 21B in the tire circumferential direction and the tire width direction can be obtained. As a result, the amount of displacement of the shoulder blocks 21A, 21B with respect to the center blocks 20 can be suppressed and wear resistance can be increased.

In the tire including the tread pattern according to the present embodiment described above, by providing the center lug grooves 14 with the first groove turning portion 14a and the second groove turning portion 14b, tread rigidity of the center blocks 20 can be increased.

Additionally, by the circumferential secondary groove 15 being disposed around the entire circumference of the tire with a wave-like shape, rigidity of the center blocks 20 and wear resistance can be maintained and heat resistance can be increased.

Furthermore, by providing the circumferential secondary groove 15 with a third groove turning portion 15a and a fourth groove turning portion 15b, tread rigidity of the center blocks 20 can be increased.

Additionally, by setting the ratio LSG/LSB of the groove width LSG of the end portion of the shoulder lug groove on the side of the ground contact edge to the length LSB in the tire circumferential direction of the end portion of the shoulder block on the side of the ground contact edge such that $0.20 \leq LSG/LSB \leq 0.35$, heat resistance can be improved while wear resistance can be maintained.

Furthermore, by providing the circumferential main grooves 11A, 11B with the raised bottom portion 11c, rigidity of the tread portion 2 can be increased and wear resistance and heat resistance can be increased.

By setting the ratio WSB/LSB of the maximum width WSB of the shoulder blocks in the tire width direction to the length LSB in the tire circumferential direction of the end portions of the shoulder blocks on the side of the ground contact edge such that $0.9 \leq WSB/LSB \leq 1.3$, an appropriate balance between rigidity of the shoulder blocks 21A, 21B in the tire circumferential direction and the tire width direction can be obtained, and thus wear resistance of the shoulder blocks 21A, 21B can be increased.

By setting the distance W1 from the end portion of the center lug groove to the tire equator line to at least 0.15 times the ground contact width T, and setting the distance W2 from the inner end of the shoulder lug groove in the tire width direction to the tire equator line to at most 0.30 times the ground contact width T, an appropriate ratio of rigidity between the center blocks 20 and the shoulder lug grooves 21A, 21B can be maintained, and good heat resistance and wear resistance can be obtained in a compatible manner.

By satisfying the relationship 0.05≤A/WB≤0.20, where WB is the maximum width of the center block in the tire width direction and A is the maximum distance from the circumferential secondary groove to the tire equator line in the tire width direction, heat resistance of the central portion of the center block which is most susceptible to heat build-up can be increased.

By the corner portions formed in the center blocks 20 corresponding to the circumferential main grooves 11A, 11B having an obtuse angle, rigidity of the center blocks 20 can be increased.

Working Examples, Conventional Example, Comparative Examples

To examine the effects of a tire according to the present embodiment, test tires with varying tread patterns were manufactured and wear resistance performance and heat build-up resistance performance of each were tested. The size of the test tires was 46/90R57.

Evaluation of Wear Resistance Performance

The manufactured test tires were mounted to an actual vehicle (200 ton dump truck) and driven at an average speed of 18 km/h for 4000 hours on an unpaved road surface. Thereafter, the amount of wear was measured. The reciprocal of the results were expressed as index values with the measurement result of the Conventional Example described below being defined as the reference (index value of 100). Larger index values indicate superior wear resistance.

Evaluation of Heat Build-Up Resistance Performance

Indoor drum testing was performed on the test tires after being mounted to TRA specified rims with a rim size of 29.00-6.0, inflated to an air pressure of 700 kPa (TRA specified air pressure), and loaded with 110% of the standard maximum load of 63000 kg so as to comply with test conditions. Starting at a speed of 5 km/h, the speed was increased by 1 km/h every 12 hours and the running time up until when the tire failed due to heat build-up was measured. Heat build-up resistance performance was evaluated with the results being expressed as index values and the running time of the Conventional Example being defined as 100.

Test tires according to the Conventional Example, Comparative Examples 1 to 3, and Working Examples 1 to 21 were manufactured.

Figure 6:
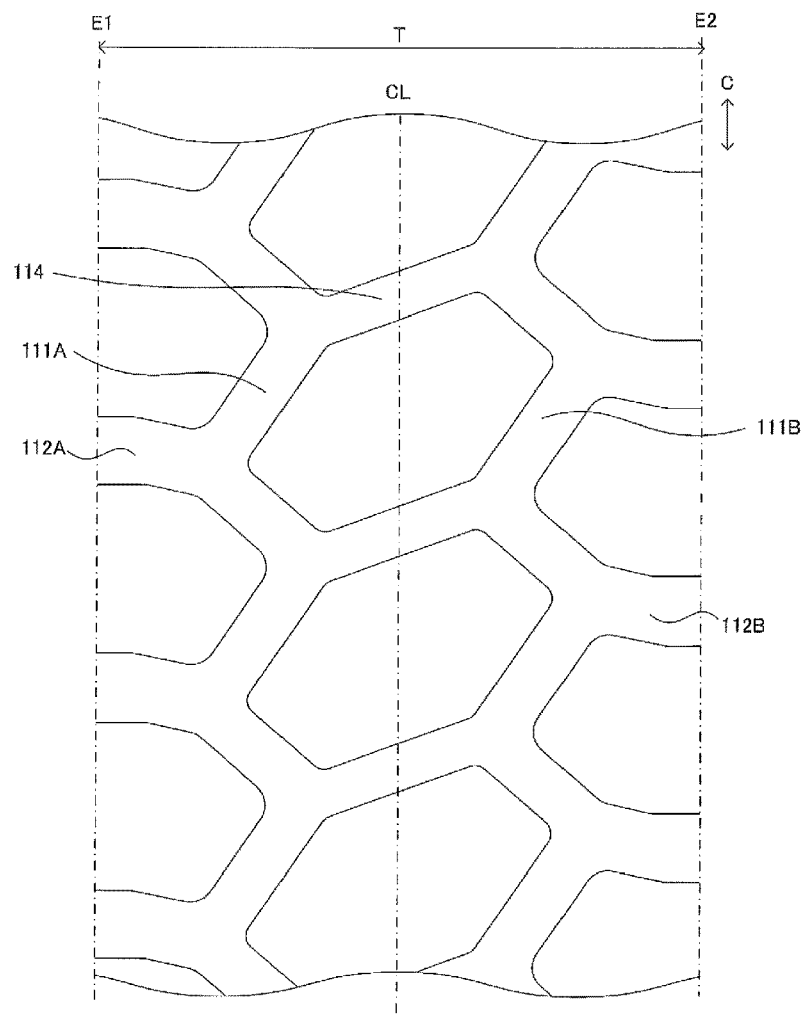
FIG. 6 is a view illustrating a tread pattern of a tire according to a conventional example.

FIG. 6 is a view illustrating a tread pattern of a tire according to a conventional example. The tread pattern illustrated in FIG. 6 is provided with a pair of circumferential main grooves 111A, 111B, shoulder lug grooves 112A, 112B, and center lug grooves 114. The circumferential main grooves 111A, 111B, the shoulder lug grooves 112A, 112B, and the center lug grooves 114 has the same configuration as their counterparts the circumferential main groove 11A, 11B, the shoulder lug grooves 12A, 12B, and the center lug grooves 14. Additionally, the width of the circumferential main grooves 111A, 111B and the shoulder lug grooves 112A, 112B is the same as that of the shoulder lug grooves 12A, 12B. A circumferential secondary groove is not provided in the land portion surrounded by the circumferential main grooves 111A, 111B and the center lug grooves 114.

In the tire of Working Example 1, the tread pattern is the same as that illustrated in FIG. 2 except that θ3 is less than θ1 and θ2.

In the tires of Working Examples 2 to 21, the tread pattern was the same as that illustrated in FIG. 2.

In the tire of Comparative Example 1, the tread pattern has a configuration in which circumferential secondary grooves are provided in the center blocks, but the circumferential secondary grooves are divided and do not connect in the tire circumferential direction with circumferential secondary grooves in the adjacent center blocks. In the tire of Comparative Example 2, the tread pattern is provided with a circumferential secondary groove continuous in the tire circumferential direction that does not include groove turning portions in the center blocks. In the tire of Comparative Example 3, the tread pattern is provided with a circumferential secondary groove continuous in the tire circumferential direction that includes a single groove turning portion in each center block.

The configuration of the components and the evaluation results for wear resistance and heat build-up resistance performance of the tread patterns are shown in Tables 1 and 2 below.

TABLE 1-1

|  | Conventional Example | Comparative Example | | |
|---|---|---|---|---|
|  |  | 1 | 2 | 3 |
| Wave-like shape of circumferential main groove | Present | Present | Present | Present |
| Continuous circumferential secondary groove | — | Absent | Present | Present |
| Groove turning portion in circumferential secondary groove | — | 2 | 0 | 1 |
| θ1(=θ2)(°) | — | 30 | 30 | 30 |
| θ3(°) | 20 | 20 | 20 | 20 |
| LSG/LSB | 0.40 | 0.40 | 0.40 | 0.40 |
| Raised bottom portion | Absent | Absent | Absent | Absent |
| D2/T | — | — | — | — |
| WSB/LSB | 0.8 | 0.8 | 0.8 | 0.8 |
| W1/T | 0.2 | 0.1 | 0.1 | 0.1 |
| W2/T | 0.2 | 0.2 | 0.2 | 0.2 |
| A/WSB | — | 0.03 | 0.03 | 0.03 |
| Wear resistance | 100 | 100 | 100 | 100 |
| Heat resistance | 100 | 101 | 102 | 102 |

TABLE 1-2

|  | Working Example | | | | |
|---|---|---|---|---|---|
|  | 1 | 2 | 3 | 4 | 5 |
| Wave-like shape of circumferential main groove | Present | Present | Present | Present | Present |
| Continuous circumferential secondary groove | Present | Present | Present | Present | Present |
| Groove turning portion in circumferential secondary groove | 2 | 2 | 2 | 2 | 2 |
| θ1(=θ2)(°) | 15 | 30 | 30 | 30 | 30 |
| θ3(°) | 20 | 20 | 20 | 20 | 20 |
| LSG/LSB | 0.40 | 0.40 | 0.15 | 0.20 | 0.28 |
| Raised bottom portion | Absent | Absent | Absent | Absent | Absent |
| D2/T | — | — | — | — | — |
| WSB/LSB | 0.8 | 0.8 | 0.8 | 0.8 | 0.8 |
| W1/T | 0.1 | 0.1 | 0.1 | 0.1 | 0.1 |
| W2/T | 0.2 | 0.2 | 0.2 | 0.2 | 0.2 |
| A/WSB | 0.03 | 0.03 | 0.03 | 0.03 | 0.03 |
| Wear resistance | 102 | 103 | 103 | 105 | 105 |
| Heat resistance | 102 | 103 | 103 | 104 | 105 |

TABLE 1-3

| | Working Example | | | |
|---|---|---|---|---|
| | 6 | 7 | 8 | 9 |
| Wave-like shape of circumferential main groove | Present | Present | Present | Present |
| Continuous circumferential secondary groove | Present | Present | Present | Present |
| Groove turning portion in circumferential secondary groove | 2 | 2 | 2 | 2 |
| θ1(=θ2)(°) | 30 | 30 | 30 | 30 |
| θ3(°) | 20 | 20 | 20 | 20 |
| LSG/LSB | 0.35 | 0.28 | 0.28 | 0.28 |
| Raised bottom portion | Absent | Present | Present | Present |
| D2/T | — | 0.05 | 0.04 | 0.3 |
| WSB/LSB | 0.8 | 0.8 | 0.8 | 0.8 |
| W1/T | 0.1 | 0.1 | 0.1 | 0.1 |
| W2/T | 0.2 | 0.2 | 0.2 | 0.2 |
| A/WSB | 0.03 | 0.03 | 0.03 | 0.03 |
| Wear resistance | 105 | 108 | 110 | 108 |
| Heat resistance | 105 | 105 | 105 | 105 |

TABLE 2-1

| | Working Example | | | |
|---|---|---|---|---|
| | 10 | 11 | 12 | 13 |
| Wave-like shape of circumferential main groove | Present | Present | Present | Present |
| Continuous circumferential secondary groove | Present | Present | Present | Present |
| Groove turning portion in circumferential secondary groove | 2 | 2 | 2 | 2 |
| θ1(=θ2)(°) | 30 | 30 | 30 | 30 |
| θ3(°) | 20 | 20 | 20 | 20 |
| LSG/LSB | 0.28 | 0.28 | 0.28 | 0.28 |
| Raised bottom portion | Present | Present | Present | Present |
| D2/T | 0.04 | 0.04 | 0.04 | 0.04 |
| WSB/LSB | 0.9 | 1.1 | 1.3 | 1.4 |
| W1/T | 0.1 | 0.1 | 0.1 | 0.1 |
| W2/T | 0.2 | 0.2 | 0.2 | 0.2 |
| A/WSB | 0.03 | 0.03 | 0.03 | 0.03 |
| Wear resistance | 112 | 113 | 112 | 110 |
| Heat resistance | 105 | 105 | 105 | 105 |

TABLE 2-2

| | Working Example | | | |
|---|---|---|---|---|
| | 14 | 15 | 16 | 17 |
| Wave-like shape of circumferential main groove | Present | Present | Present | Present |
| Continuous circumferential secondary groove | Present | Present | Present | Present |
| Groove turning portion in circumferential secondary groove | 2 | 2 | 2 | 2 |
| θ1(=θ2)(°) | 30 | 30 | 30 | 30 |
| θ3(°) | 20 | 20 | 20 | 20 |
| LSG/LSB | 0.28 | 0.28 | 0.28 | 0.28 |
| Raised bottom portion | Present | Present | Present | Present |
| D2/T | 0.04 | 0.04 | 0.04 | 0.04 |
| WSB/LSB | 1.1 | 1.1 | 1.1 | 1.1 |
| W1/T | 0.15 | 0.2 | 0.25 | 0.25 |
| W2/T | 0.2 | 0.25 | 0.3 | 0.35 |
| A/WSB | 0.03 | 0.03 | 0.03 | 0.03 |
| Wear resistance | 115 | 117 | 115 | 113 |
| Heat resistance | 105 | 105 | 105 | 105 |

TABLE 2-3

| | Working Example | | | |
|---|---|---|---|---|
| | 18 | 19 | 20 | 21 |
| Wave-like shape of circumferential main groove | Present | Present | Present | Present |
| Continuous circumferential secondary groove | Present | Present | Present | Present |
| Groove turning portion in circumferential secondary groove | 2 | 2 | 2 | 2 |
| θ1(=θ2)(°) | 30 | 30 | 30 | 30 |
| θ3(°) | 20 | 20 | 20 | 20 |
| LSG/LSB | 0.28 | 0.28 | 0.28 | 0.28 |
| Raised bottom portion | Present | Present | Present | Present |
| D2/T | 0.04 | 0.04 | 0.04 | 0.04 |
| WSB/LSB | 1.1 | 1.1 | 1.1 | 1.1 |
| W1/T | 0.2 | 0.2 | 0.2 | 0.2 |
| W2/T | 0.25 | 0.25 | 0.25 | 0.25 |
| A/WSB | 0.05 | 0.1 | 0.2 | 0.25 |
| Wear resistance | 117 | 117 | 117 | 115 |
| Heat resistance | 107 | 108 | 107 | 105 |

By comparing the Conventional Example and Comparative Examples 1 to 3, it can be seen that by providing a circumferential secondary groove, heat build-up resistance increases but wear resistance performance decreases. Additionally, by comparing Comparative Examples 1 to 3, it can be seen that configurations in which the circumferential secondary groove was continuous in the tire circumferential direction (Comparative Example 2 and 3) have high heat resistance than configurations in which the circumferential secondary groove is not continuous in the tire circumferential direction (Comparative Example 1).

By comparing Comparative Examples 2 and 3 and Working Examples 1 and 2, it can be seen that configurations with two groove turning portions (Working Examples 1 and 2) have better wear resistance than configurations with no groove turning portions in the circumferential secondary groove (Comparative Example 2) and configuration with a single groove turning portion (Comparative Example 3).

By comparing Working Example 1 and 2, it can be seen that Working Example 2 in which θ1 and θ2 are greater than θ3 has better wear resistance and heat resistance than Working Example 1 in which θ3 is greater than θ1 and θ2.

By comparing Working Examples 2 to 6, it can be see that configurations in which LSG/LSB ranges from 0.20 to 0.35 can further increase wear resistance while maintaining heat resistance.

By comparing Working Example 5 and 7, it can be seen that configurations provided with a raised bottom portion, have an even high wear resistance compared to configurations without a raised bottom portion. Additionally, by comparing Working Examples 7 to 9, it can be seen that configurations in which D2/T is less than 0.05 have particularly high wear resistance.

By comparing Working Examples 8 and 10 to 13, it can be seen that configurations in which WSB/LSB ranges from 0.9 to 1.3 have even higher wear resistance while maintaining heat build-up resistance.

By comparing Working Examples 11 and 14 to 17, it can be seen that configurations in which W1/T is 0.15 or greater and W2/T is 0.30 or less can further increase wear resistance while maintaining heat build-up resistance.

By comparing Working Examples 15 and 18 to 21, it can be seen that configuration in which A/WB range from 0.05 to 0.2 have even higher heat resistance.

This clearly demonstrates the effect of the present embodiment.

The foregoing has been a detailed description of the pneumatic tire of the present technology. However, the present technology is not limited to the above embodiments, and may be improved or modified in various ways within the scope of the present technology.

The invention claimed is:

1. A heavy duty pneumatic tire comprising
a tread portion provided with a tread pattern,
the tread pattern comprising:
a plurality of center lug grooves disposed at intervals in a tire circumferential direction that extend crossing a tire equator line, the plurality of center lug grooves each comprising:
a first end located in a half-tread region that is on a first side of the tire equator line in a tire width direction,
a second end located in a half-tread region on a second side opposite the first side in the tire width direction, and
a first groove turning portion and a second groove turning portion disposed between the first end and the second end, the first groove turning portion turning with a bent shape or a curved shape and being located on a side of the first end, the second groove turning portion turning with a bent shape or a curved shape and being located on a side of the second end;
a plurality of shoulder lug grooves disposed in the intervals in the tire circumferential direction between the plurality of center lug grooves in both of the half-tread regions that extend outward in the tire width direction, the plurality of shoulder lug grooves each comprising:
an outer end in the tire width direction that opens to a ground contact edge on each of opposite sides in the tire width direction, and
an inner end in the tire width direction located on an outside of a position in the tire width direction of the first end or the second end in the tire width direction;
a pair of circumferential main grooves disposed in the respective half-tread regions that extend around an entire circumference of the pneumatic tire in a wave-like shape with a groove width less than that of the plurality of shoulder lug grooves, the pair of circumferential main grooves alternately connecting the respective first end or second end and the inner end of each of the plurality of shoulder lug grooves in the tire width direction;
a plurality of center blocks arranged in the tire circumferential direction and defined by the plurality of center lug grooves and the pair of circumferential main grooves;
a plurality of shoulder blocks arranged in the tire circumferential direction and defined by the plurality of shoulder lug grooves and the pair of circumferential main grooves; and
a circumferential secondary groove with a wave-like shape disposed around the entire circumference of the pneumatic tire, the circumferential secondary groove intersecting the plurality of center lug grooves in a manner such that in each of the plurality of center blocks, the circumferential secondary groove alternately connects the first groove turning portion and the second groove turning portion, the first groove turning portion being in a center lug groove of adjacent center lug grooves of the plurality of center lug grooves on either side of each of the plurality of center blocks in the tire circumferential direction, the second groove turning portion being in the other center lug groove of the adjacent center lug grooves, and portions of the circumferential secondary groove on both sides in the tire circumferential direction of each of the center lug grooves share a position of the first groove turning portion or the second groove turning portion in the tire width direction;
the circumferential secondary groove comprising in each of the plurality of center blocks a third groove turning portion that turns with a bent shape or a curved shape located on a side of the first groove turning portion and a fourth groove turning portion that turns with a bent shape or a curved shape located on a side of the second groove turning portion.

2. The heavy duty pneumatic tire according to claim 1, wherein a relationship $0.20 \leq LSG/LSB \leq 0.35$ is satisfied, where LSB is a length in the tire circumferential direction of end portions of the plurality of shoulder blocks on a side of the ground contact edge, and LSG is a groove width of end portions of the plurality of shoulder lug grooves on a side of the ground contact edge.

3. The heavy duty pneumatic tire according to claim 1, further comprising a raised bottom portion in each of the pair of circumferential main grooves where the groove becomes partially shallower.

4. The heavy duty pneumatic tire according to claim 3, wherein a relationship $D2/T<0.05$ is satisfied, where D2 is a groove depth of the raised bottom portion and T is a ground contact width of the tread portion in the tire width direction.

5. The heavy duty pneumatic tire according to claim 1, wherein a relationship $0.9 \leq WSB/LSB \leq 1.3$ is satisfied, where LSB is a length in the tire circumferential direction of end portions of the plurality of shoulder blocks on a side of the ground contact edge, and WSB is a maximum width of the plurality of shoulder blocks in the tire width direction.

6. The heavy duty pneumatic tire according to claim 1, wherein
a distance W1 from end portions of the plurality of center lug grooves to the tire equator line is at least 0.15 times a ground contact width T of the tread portion in the tire width direction; and
a distance W2 from inner ends of the plurality of shoulder lug grooves in the tire width direction to the tire equator line is at most 0.30 times the ground contact width T.

7. The heavy duty pneumatic tire according to claim 1, wherein a relationship $0.05 \leq A/WB \leq 0.20$ is satisfied, where WB is a maximum width of the plurality of center blocks in the tire width direction, and A is a maximum distance from the circumferential secondary groove to the tire equator line in the tire width direction.

8. The heavy duty pneumatic tire according to claim 1, wherein corner portions with an obtuse angle are formed in the plurality of center blocks corresponding to the pair of circumferential main grooves.

9. The heavy duty pneumatic tire according to claim 1, wherein a groove width of the pair of circumferential main grooves and a groove width of the plurality of center lug grooves range from 7 mm to 20 mm.

10. The heavy duty pneumatic tire according to claim 1, wherein the heavy duty pneumatic tire is mounted on a construction vehicle or an industrial vehicle.

11. The heavy duty pneumatic tire according to claim 1, wherein
the first groove turning portion disposed on the first side bends or curves protruding out toward a third side in the tire circumferential direction, the second groove turning portion disposed on the second side bends or curves protruding out toward a fourth side opposite the third side in the tire circumferential direction; and an inclination angle with respect to the tire width direction of a first straight line that joins the first end and a protruding end where the first groove turning portion protrudes toward the third side in the tire circumferential direction and an inclination angle with respect to the tire width direction of a second straight line that joins the second end and a protruding end where the second groove turning portion protrudes toward the fourth side in the tire circumferential direction are greater than an inclination angle with respect to the tire width direction of a third straight line that joins the first end and the second end of each of the plurality of center lug grooves, the straight lines following center positions in a groove width direction of the center lug grooves.

12. The heavy duty pneumatic tire according to claim 1, wherein an inclination angle with respect to the tire width direction of a fourth straight line that joins a third end of the circumferential secondary groove within the plurality of center blocks on a side of the first groove turning portion and the third groove turning portion and an inclination angle with respect to the tire width direction of a fifth straight line that joins a fourth end on a side of the second groove turning portion and the fourth groove turning portion are greater than an inclination angle with respect to the tire width direction of a sixth straight line that joins the third end and the fourth end.

13. The heavy duty pneumatic tire according to claim 1, wherein the circumferential secondary groove intersects the tire equator line between the third groove turning portion and the fourth groove turning portion.

14. The heavy duty pneumatic tire according to claim 1, wherein the portions of the circumferential secondary groove on both sides in the tire circumferential direction of each of the center lug grooves share an identical angle with respect to the tire circumferential direction.

15. A heavy duty pneumatic tire comprising
a tread portion provided with a tread pattern,
the tread pattern comprising:
a plurality of center lug grooves disposed at intervals in a tire circumferential direction that extend crossing a tire equator line, the plurality of center lug grooves each comprising:
a first end located in a half-tread region that is on a first side of the tire equator line in a tire width direction,
a second end located in a half-tread region on a second side opposite the first side in the tire width direction, and
a first groove turning portion and a second groove turning portion disposed between the first end and the second end, the first groove turning portion turning with a bent shape or a curved shape and being located on a side of the first end, the second groove turning portion turning with a bent shape or a curved shape and being located on a side of the second end;

a plurality of shoulder lug grooves disposed in the intervals in the tire circumferential direction between the plurality of center lug grooves in both of the half-tread regions that extend outward in the tire width direction, the plurality of shoulder lug grooves each comprising:
an outer end in the tire width direction that opens to a ground contact edge on each of opposite sides in the tire width direction, and
an inner end in the tire width direction located on an outside of a position in the tire width direction of the first end or the second end in the tire width direction;
a pair of circumferential main grooves disposed in the respective half-tread regions that extend around an entire circumference of the pneumatic tire in a wave-like shape with a groove width less than that of the plurality of shoulder lug grooves, the pair of circumferential main grooves alternately connecting the respective first end or second end and the inner end of each of the plurality of shoulder lug grooves in the tire width direction;
a plurality of center blocks arranged in the tire circumferential direction and defined by the plurality of center lug grooves and the pair of circumferential main grooves;
a plurality of shoulder blocks arranged in the tire circumferential direction and defined by the plurality of shoulder lug grooves and the pair of circumferential main grooves; and
a circumferential secondary groove with a wave-like shape disposed around the entire circumference of the pneumatic tire, the circumferential secondary groove intersecting the plurality of center lug grooves in a manner such that in each of the plurality of center blocks, the circumferential secondary groove alternately connects the first groove turning portion and the second groove turning portion, the first groove turning portion being in a center lug groove of adjacent center lug grooves of the plurality of center lug grooves on either side of each of the plurality of center blocks in the tire circumferential direction, the second groove turning portion being in the other center lug groove of the adjacent center lug grooves;
the circumferential secondary groove comprising in each of the plurality of center blocks a third groove turning portion that turns with a bent shape or a curved shape located on a side of the first groove turning portion and a fourth groove turning portion that turns with a bent shape or a curved shape located on a side of the second groove turning portion; and
the circumferential secondary groove crossing the tire equator line once between the adjacent center lug grooves in a crossing direction, the crossing direction changing alternately between a direction from the first side to the second side and another direction from the second side to the first side in the tire width direction when the circumferential secondary groove going around the entire circumference of the pneumatic tire.

* * * * *